(12) United States Patent
Wallace et al.

(10) Patent No.: US 8,488,565 B2
(45) Date of Patent: *Jul. 16, 2013

(54) ACQUISITION OF TIMING INFORMATION IN WIRELESS COMMUNICATION SYSTEMS

(75) Inventors: Mark S Wallace, Bedford, MA (US); Jay Rodney Walton, Carlisle, MA (US); Irina Medvedev, Somerville, MA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 13/192,320

(22) Filed: Jul. 27, 2011

(65) Prior Publication Data

US 2011/0286556 A1     Nov. 24, 2011

Related U.S. Application Data

(63) Continuation of application No. 12/022,975, filed on Jan. 30, 2008, now Pat. No. 7,995,616.

(51) Int. Cl.
    *H04B 7/216*    (2006.01)
(52) U.S. Cl.
    USPC .......................................................... 370/335
(58) Field of Classification Search
    None
    See application file for complete search history.

(56) References Cited

U.S. PATENT DOCUMENTS

| | | | |
|---|---|---|---|
| 5,917,829 A * | 6/1999 | Hertz et al. | 370/479 |
| 7,203,245 B1 | 4/2007 | Murphy | |
| 7,280,621 B1 * | 10/2007 | Murphy | 375/340 |

| | | | |
|---|---|---|---|
| 2002/0114270 A1 * | 8/2002 | Pierzga et al. | 370/208 |
| 2005/0152317 A1 | 7/2005 | Awater et al. | |
| 2007/0147552 A1 | 6/2007 | Olesen et al. | |

FOREIGN PATENT DOCUMENTS

| | | |
|---|---|---|
| EP | 1071251 A2 | 1/2001 |
| EP | 1317094 A2 | 6/2003 |

OTHER PUBLICATIONS

International Search Report—PCT/US08/052816, International Searching Authority—European Patent Office, Dec 3, 2008.
Liang, et al., "Synchronization of OFDM-based WLAN with Transmit and Receive Diversities," Personal, Indoor and Mobile Radio Communications, 2005. PIRMC 2005.
IEEE 16th International Symposium on Berlin, Germany Sep. 11-14, 2005, Piscataway, NJ, USA, IEEE.
Taiwan Search Report-TW097114686-TIPO-Sep. 22, 2011.
Written Opinion—PCT/US08/052816, International Searching Authority—European Patent Office, Dec. 3, 2008.

* cited by examiner

*Primary Examiner* — Raj Jain
(74) *Attorney, Agent, or Firm* — QUALCOMM Patent Group; James Hunt Yancey, Jr.

(57) ABSTRACT

A method for identifying a reference point in time in a wireless communication system includes: receiving a first repeated sequence of symbols; receiving a second repeated sequence of symbols; performing an autocorrelation between the first and second sequences of symbols; and identifying as the reference point in time an autocorrelation null between the first and second repeated sequences of symbols. Apparatus for identifying a reference point in time in a wireless communication system includes: means for receiving a first repeated sequence of symbols; means for receiving a second repeated sequence of symbols; means for performing an autocorrelation between the first and second sequences of symbols; and means for identifying as the reference point in time an autocorrelation null between the first and second repeated sequences of symbols. Other aspects, features, and embodiments are also claimed and described.

9 Claims, 11 Drawing Sheets

US 8,488,565 B2

ACQUISITION OF TIMING INFORMATION IN WIRELESS COMMUNICATION SYSTEMS

CROSS REFERENCE TO RELATED APPLICATION & PRIORITY CLAIM

The present Application for Patent is a continuation of U.S. Non-Provisional patent application Ser. No. 12/022,975, entitled "ACQUISITION OF TIMING INFORMATION IN WIRELESS COMMUNICATION SYSTEMS" filed Jan. 30, 2008, issuing as U.S. Pat. No. 7,995,616 and assigned to the assignee hereof and hereby expressly incorporated by reference herein.

FIELD

The present disclosure relates generally to methods and apparatus for acquiring timing information in wireless communication systems, and more specifically to methods and apparatus for doing so in multiple-input, multiple-output (MIMO) systems, especially those employing orthogonal frequency division multiplexing (OFDM) to permit multiple-access.

BACKGROUND

Wireless communication systems including those defined by the IEEE 802.11 series of specifications transmit information in the form of symbols represented by signals having very specific characteristics of frequency, phase, and consequently, timing. In the 802.11n standard, for example, the timing by which information may be derived from a transmitted frame is defined relative to an origin. That origin is defined by two training fields that precede the data-carrying portion of the frame.

Conventionally, the origin is identified by performing autocorrelation on a received signal, and identifying a peak in the resulting autocorrelation function. In MIMO systems, as well as other transmission systems, signals transmitted from a transmitter to a receiver may take paths that reduce their coherence, introducing errors referred to as multi-path errors. For example, part of a signal may travel directly from the transmitter to the receiver, while another part of the signal may reflect off of nearby objects on the way from the transmitter to the receiver. As a result, the resolution with which the origin can be determined may be limited due to smearing of the peak of the autocorrelation function so that the time at which the peak occurs cannot be precisely determined. There is therefore a need in the art for methods and apparatus that more accurately determine the time of the origin.

SUMMARY

Some embodiments disclosed herein address the above stated needs by searching for a minimum of the autocorrelation function of a received signal and the additional gain achieved by coherent combination over receiver diversities.

According to aspects of one embodiment, a method for identifying a reference point in time in a signal transmitted in a wireless communication system comprises receiving a series of samples of the signal including a first repeated sequence of symbols and a second repeated sequence of symbols; defining a first window having a first starting point and including a first group of samples of the series and a second window having a second starting point which varies relative to the first starting point and including a second group of samples of the series; performing an autocorrelation between the first and second groups of samples; and identifying as the reference point in time a sample at which a null occurs in the autocorrelation. In a variation, the method further comprises observing a result of the autocorrelation; observing a power ratio between the first and second sequences of symbols; computing a ratio between the result observed and the power ratio observed; and determining a packet to be detected when the computed ratio exceeds a predetermined threshold. In another variation, the method further comprises summing autocorrelation results coherently across plural receive diversities; and correcting the plural receive diversities by the measured phase offset.

According to aspects of another embodiment, a computer readable medium carries instructions for identifying a reference point in time in a signal comprises receiving a series of samples of the signal including a first repeated sequence of symbols and a second repeated sequence of symbols; defining a first window having a first starting point and including a first group of samples of the series and a second window having a second starting point which varies relative to the first starting point and including a second group of samples of the series; performing an autocorrelation between the first and second groups of samples; and identifying as the reference point in time a sample at which a null occurs in the autocorrelation. In a variation, the method carried by the computer readable medium further comprises observing a result of the autocorrelation; observing a power ratio between the first and second sequences of symbols; computing a ratio between the result observed and the power ratio observed; and determining a packet to be detected when the computed ratio exceeds a predetermined threshold. In another variation, the method carried by the computer readable medium further comprises summing autocorrelation results coherently across plural receive diversities; and correcting the plural receive diversities by the measured phase offset.

According to aspects of yet another embodiment, a remote system includes means for receiving a series of samples including a first repeated sequence of symbols and a second repeated sequence of symbols; means for defining a first window having a first starting point and including a first group of samples of the series and a second window having a second starting point which varies relative to the first starting point and including a second group of samples of the series; means for performing an autocorrelation between the first and second groups of samples; and means for identifying as the reference point in time a sample at which a null occurs in the autocorrelation. In a variation, the remote system further comprises means for observing a result of the autocorrelation; means for observing a power ratio between the first and second sequences of symbols; means for computing a ratio between the result observed and the power ratio observed; and means for determining a packet to be detected when the computed ratio exceeds a predetermined threshold. In another variation, the remote system further comprises means for summing autocorrelation results coherently across plural receive diversities; and means for correcting the plural receive diversities by the measured phase offset.

According to aspects of yet another embodiment, a base station includes means for receiving a series of samples including a first repeated sequence of symbols and a second repeated sequence of symbols; means for defining a first window having a first starting point and including a first group of samples of the series and a second window having a second starting point which varies relative to the first starting point and including a second group of samples of the series; means for performing an autocorrelation between the first and second groups of samples; and means for identifying as the reference point in time a sample at which a null occurs in the autocorrelation. In a variation, the remote system further comprises means for observing a result of the autocorrelation; means for observing a power ratio between the first and second sequences of symbols; means for computing a ratio between the result observed and the power ratio observed; and means for determining a packet to be detected when the computed ratio exceeds a predetermined threshold. In another variation, the remote system further comprises means for summing autocorrelation results coherently across plural receive diversities; and means for correcting the plural receive diversities by the measured phase offset.

According to aspects of yet a further embodiment, a wireless communication system includes means for receiving a series of samples including a first repeated sequence of symbols and a second repeated sequence of symbols; means for defining a first window having a first starting point and including a first group of samples of the series and a second window having a second starting point which varies relative to the first starting point and including a second group of samples of the series; means for performing an autocorrelation between the first and second groups of samples; and means for identifying as the reference point in time a sample at which a null occurs in the autocorrelation. In a variation, the remote system further comprises means for observing a result of the autocorrelation; means for observing a power ratio between the first and second sequences of symbols; means for computing a ratio between the result observed and the power ratio observed; and means for determining a packet to be detected when the computed ratio exceeds a predetermined threshold. In another variation, the remote system further comprises means for summing autocorrelation results coherently across plural receive diversities; and means for correcting the plural receive diversities by the measured phase offset.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
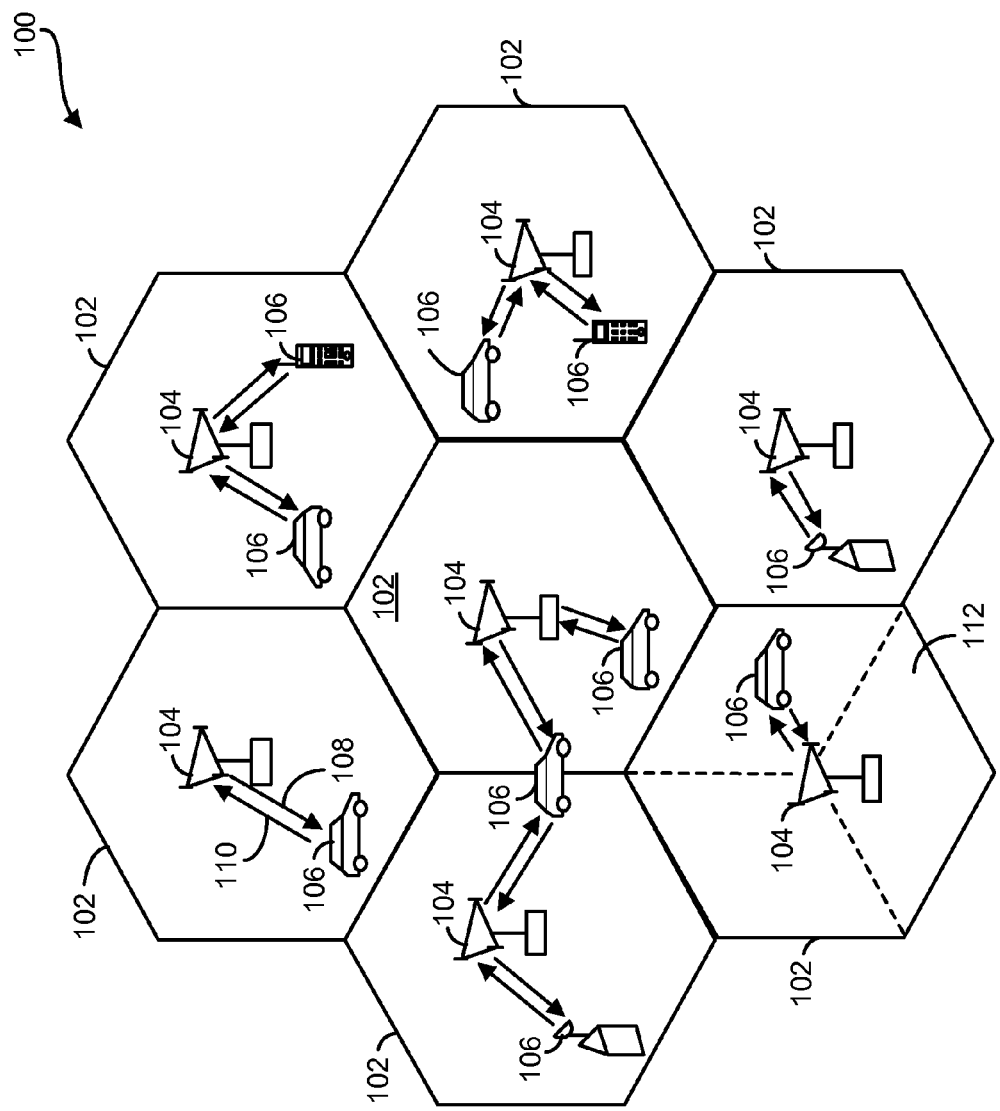
FIG. 1 illustrates an example of a wireless communication system, which might be capable of using certain embodiments.

FIG. 1 illustrates an example of a wireless communication system 100. The wireless communication system 100 may be a broadband wireless communication system 100. The wireless communication system 100 provides communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 shows various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system 100.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within an OFDM/OFDMA system 100 may utilize antennas that concentrate the flow of power within a particular sector 112 of the cell 102. Such antennas may be referred to as directional antennas.

Figure 2:
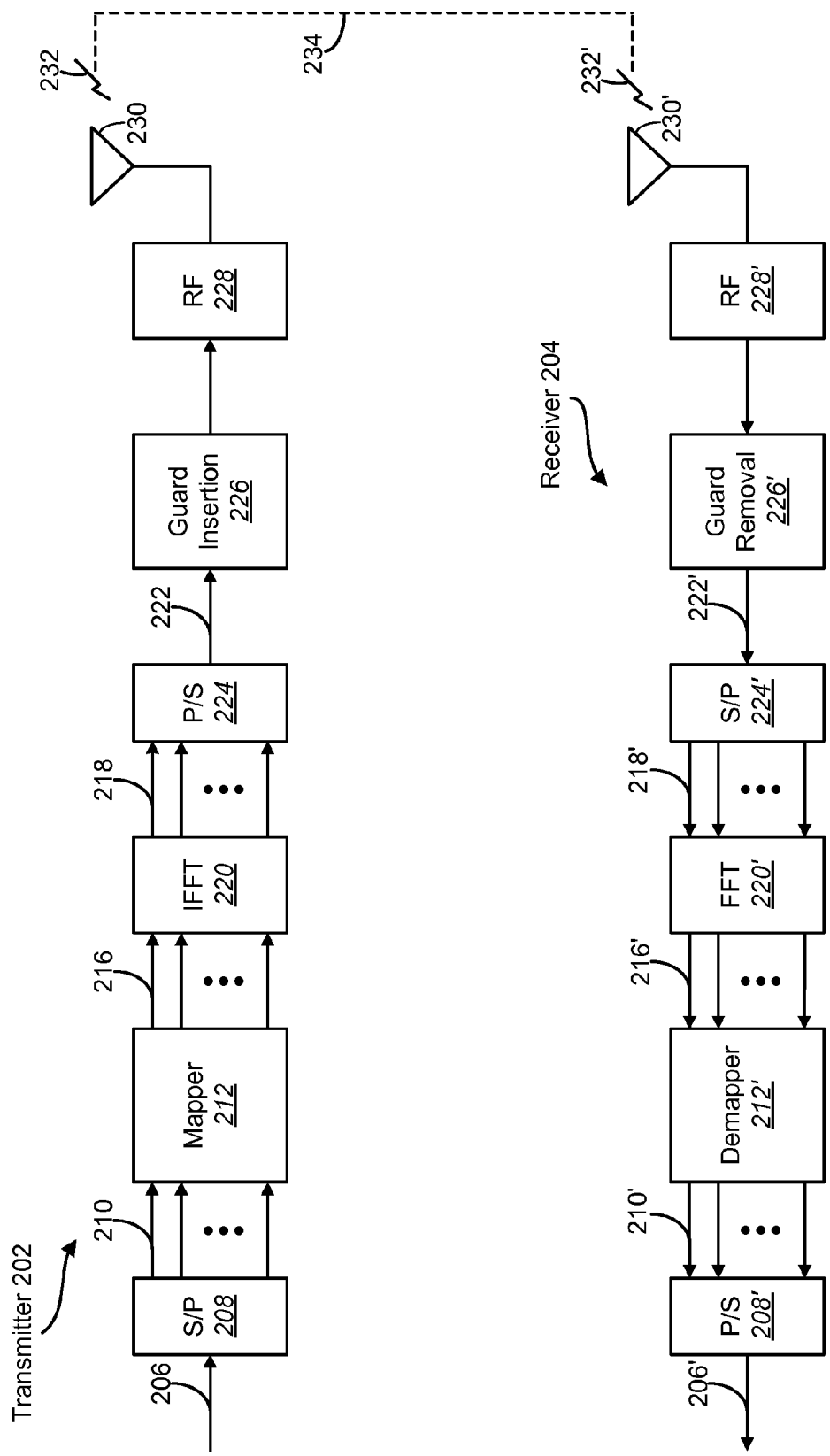
FIG. 2 illustrates an example of a transmitter and an example of a receiver that may be used within a wireless communication system that utilizes orthogonal frequency division multiplexing (OFDM) and orthogonal frequency divisional multiple access (OFDMA) according to certain embodiments.

FIG. 2 illustrates an example of a transmitter 202 that may be used within a wireless communication system 100 that utilizes OFDM/OFDMA. The transmitter 202 may be implemented in a base station 104 for transmitting data 206 to a user terminal 106 on a downlink 108. The transmitter 202 may also be implemented in a user terminal 106 for transmitting data 206 to a base station 104 on an uplink 110.

Data 206 to be transmitted is shown being provided as input to a serial-to-parallel (S/P) converter 208. The S/P converter 208 splits the transmission data into N parallel data streams 210.

The N parallel data streams 210 may then be provided as input to a mapper 212. The mapper 212 maps the N parallel data streams 210 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 212 outputs N parallel symbol streams 216, each symbol stream 216 corresponding to one of the N orthogonal sub-carriers of the inverse fast Fourier transform (IFFT) 220. These N parallel symbol streams 216 are represented in the frequency domain, and may be converted into N parallel time domain sample streams 218 by an IFFT component 220.

A brief note about terminology will now be provided. N parallel modulations in the frequency domain are equal to N modulation symbols in the frequency domain, which are equal to N mapping plus N-point IFFT in the frequency domain, which is equal to one (useful) OFDM symbol in the time domain, which is equal to N samples in the time domain. One OFDM symbol in the time domain, Ns, is equal to Ncp (the number of guard samples per OFDM symbol)+N (the number of useful samples per OFDM symbol).

The N parallel time domain sample streams 218 may be converted into an OFDM/OFDMA symbol stream 222 by a parallel-to-serial (P/S) converter 224. A guard insertion component 226 may insert a guard interval between successive OFDM/OFDMA symbols in the OFDM/OFDMA symbol stream 222. The output of the guard insertion component 226 may then be upconverted to a desired transmit frequency band by a radio frequency (RF) front end 228. An antenna 230 may then transmit the resulting signal 232.

FIG. 2 also illustrates an example of a receiver 204 that may be used within a wireless communication system 100 that utilizes OFDM/OFDMA. The receiver 204 may be implemented in a user terminal 106 for receiving data 232' from a base station 104 on a downlink 108. The receiver 204 may also be implemented in a base station 104 for receiving data 232' from a user terminal 106 on an uplink 110.

The transmitted signal 232 is shown traveling over a wireless channel 234. When a signal 232' is received by an antenna 230', the received signal 232' may be downconverted to a baseband signal by an RF front end 228'. A guard removal component 226' may then remove the guard interval that was inserted between OFDM/OFDMA symbols by the guard insertion component 226.

The output of the guard removal component 226' may be provided to an S/P converter 224'. The S/P converter 224' may divide the OFDM/OFDMA symbol stream 222' into the N parallel time-domain symbol streams 218', each of which corresponds to one of the N orthogonal sub-carriers. A fast Fourier transform (FFT) component 220' converts the N parallel time-domain symbol streams 218' into the frequency domain, and outputs N parallel frequency-domain symbol streams 216'.

A demapper 212' performs the inverse of the symbol mapping operation that was performed by the mapper 212, thereby outputting N parallel data streams 210'. A P/S converter 208' combines the N parallel data streams 210' into a single data stream 206'. Ideally, this data stream 206' corresponds to the data 206 that was provided as input to the transmitter 202.

Figure 3:
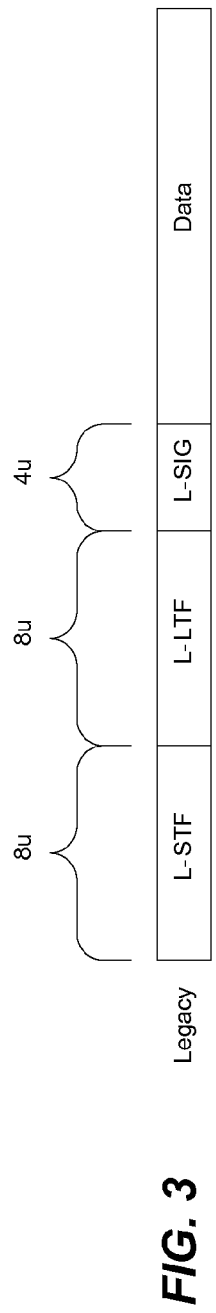
FIG. 3 illustrates a timing diagram illustrating the placement of certain blocks of information within a Legacy frame as used by 802.11a and g according to certain embodiments.
Figure 4:
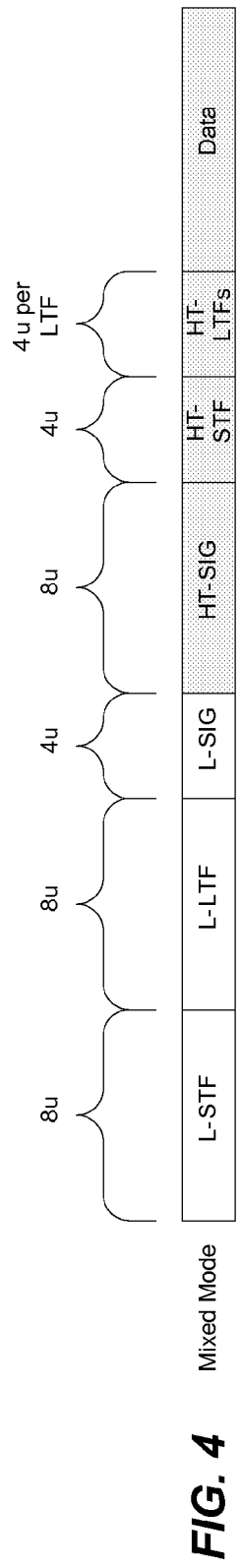
FIG. 4 illustrates a timing diagram illustrating the placement of certain blocks of information within a Mixed Mode frame as used by some 802.11n systems according to certain embodiments.
Figure 5:
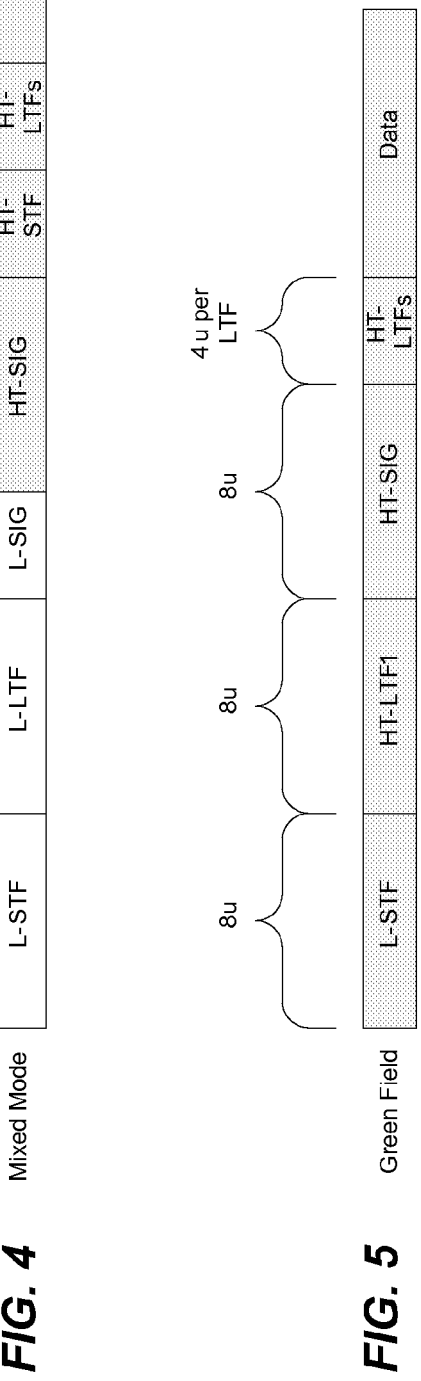
FIG. 5 illustrates a timing diagram illustrating the placement of certain blocks of information within a Green Field frame as used by some 802.11n systems according to certain embodiments.

The three types of frame formats recognizable to an 802.11n device are shown in FIGS. 3, 4 and 5, where the first frame format, Legacy (FIG. 3), corresponds to the frame format of 802.11a and g devices, and the next two frame formats, Mixed Mode (FIG. 4) and Green Field (FIG. 5), are specific to 802.11n systems. Once the presence of a signal is detected, acquisition of a time reference uses no more than the first 16 μs of any of the frame formats shown (FIGS. 3, 4 and 5). The first 16 μs of each frame are identical for the Legacy Mode and the Mixed Mode. The first 16 μs of a Green Field Mode frame is slightly different from the same portion of the Legacy Mode and Mixed Mode frames. This difference does not affect the proposed method for acquisition of the time reference, and the method described below may thus be applied to various 802.11 devices, including those conforming to any one of the 802.11a, g, n specifications. Moreover, the method is applicable to any devices with frame formats and characteristics similar to those shown in any of FIGS. 3, 4 and 5, and as explained further below, in the same manner.

Acquisition processing is performed in the time domain. In the exemplary embodiment, samples are spaced 50 ns apart, although other embodiments may digitize at other intervals. That is, a signal, for example a wireless signal, is received and digitized into 50 ns samples. For other digitization intervals, the numbers of samples, timing and intervals mentioned below would be adjusted accordingly. The time domain processing that is described next, is performed on the digitized time domain samples. This processing may be performed by specialized computational hardware, for example application specific integrated circuits (ASICs), or may be performed by general purpose hardware programmed to perform the specialized acts described herein, for example a suitably programmed general purpose processor or a suitably programmed digital signal processor (DSP). The choice of hardware implementation will depend on the desired speed, cost, size and other design considerations.

In the time domain, in the example using 50 ns samples, the Legacy Short Training Field (L-STF) is 160 samples long and consists of 10 repeated short pilots of 16 samples each. The Legacy Long Training Field (L-LTF), in Legacy and Mixed Mode, and High Throughput Long Training Field 1 (HT-LTF1), in Green Field mode, are 160 samples long and consist of a 32-sample cyclic prefix followed by two repeats of 64 samples each.

Figure 6:
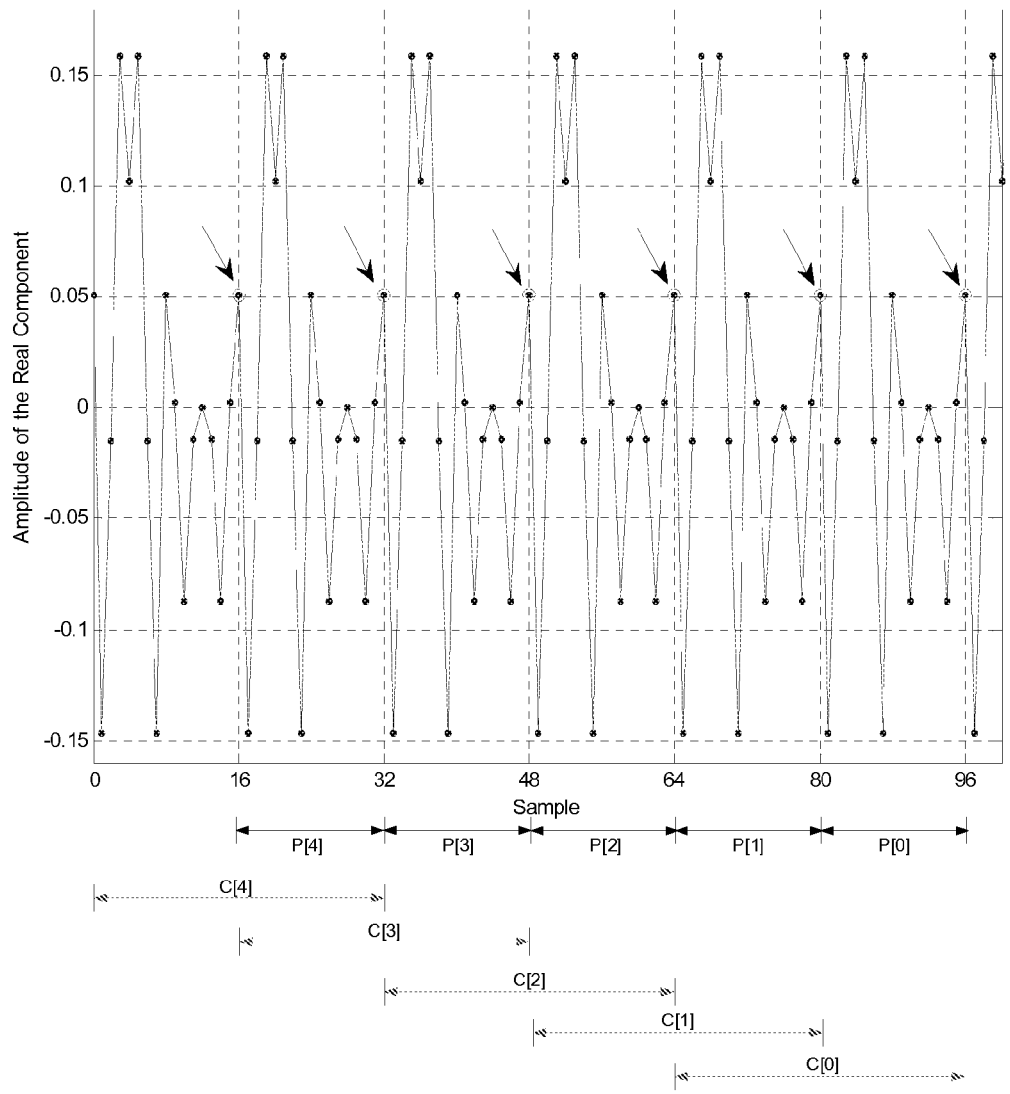
FIG. 6 illustrates a waveform diagram showing a received time domain waveform including at least part of the training fields according to certain embodiments.

For the initial detection, an autocorrelation function, C, over each 16-sample window is computed over every 16 samples, and a power function, P, over each 16-sample window is computed over every 16 samples. Starting at sample 16, the autocorrelation and power are obtained as follows:

$$C = \sum_{i=n}^{n+15} x_i x^*_{i-16}$$

and $$P = \sum_{i=n}^{n+15} x_i x^*_i,$$

where $x_i$ is the $i^{th}$ sample of the time-domain waveform, an example of which is shown in FIG. 6, and n is the sample index, n={16, 32, 64, ...}, denoted by the circles in FIG. 6.

Once the autocorrelation and power have been computed five times, the following computations are performed:

$$A = \sum_{i=0}^{3} C[i]$$

and $$P_{sum} = \sum_{i=0}^{4} P[i]$$

$$\text{ratio} = |A|/|P_{sum}|$$

$$\text{phase\_shift} = \tan^{-1}\left(\frac{\text{imag}(A)}{\text{real}(A)}\right)/(2\pi).$$

Note that the past four power calculations are summed, while only the last three correlation values are used. The above calculations, including correlation and power, are performed every 16 samples. Note that C[0] and P[0] correspond to the most recent calculations at the current sample n.

Detection is declared when either the first or both the first and second conditions are met two times in a row, that is:

1) the ratio, ratio, is less than a preset detection threshold; and/or 2) the angle, |phase shift|, is less than a preset phase shift threshold.

The preset detection threshold may be set according to desired probability of detection or false alarm rate statistics. The preset phase shift threshold may be a function of the highest possible phase shift tolerable by the system.

Once initial detection is declared, the system performs a series of instructions and/or acts that search a sequence of autocorrelation values $C_j$ at a spacing of 64 samples for the point where the correlation function drops to ½ the maximum value. The sequence of autocorrelation values $C_j$ is defined by the following equation:

$$C_j = \sum_{i=0}^{n-1} x_{i+j} x_{i+j+64}^*$$

Figure 7:
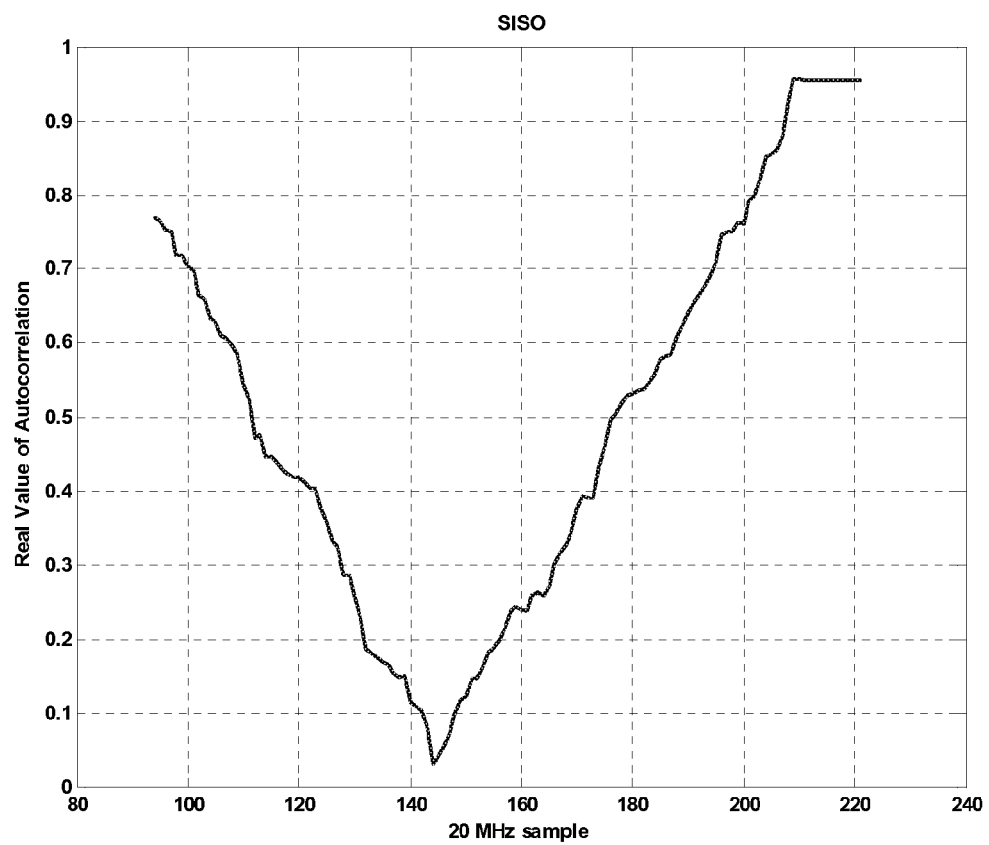
FIG. 7 illustrates a waveform diagram showing an autocorrelation function computed for a region including a transition from a Short Training Field to a Long Training Field according to certain embodiments.

In the exemplary embodiment, an autocorrelation is performed for each receive antenna, on each received and sampled signal using a spacing of 64 samples. The spacing of 64 samples relates to the STF and LTF signals used in systems conforming to 802.11a, g and n specifications; other embodiments may use different autocorrelation spacing. The autocorrelation outputs are then summed coherently across the receive diversities and corrected by the measured phase offset. The STF and LTF signals used in systems conforming to 802.11a, g and n specifications yield an autocorrelation that has a null at the point of the transition of the STF to the LTF, as shown in FIG. 7. Thus, the minimum of the real part of the phase-corrected autocorrelation sum is searched for, starting at the location of the drop to ½ the maximum value found above. Using the real part improves the signal to noise ration (SNR) of the signal used to find the origin and the minimum value corresponds precisely to the transition point between the STF and the LTF.

Figure 8:
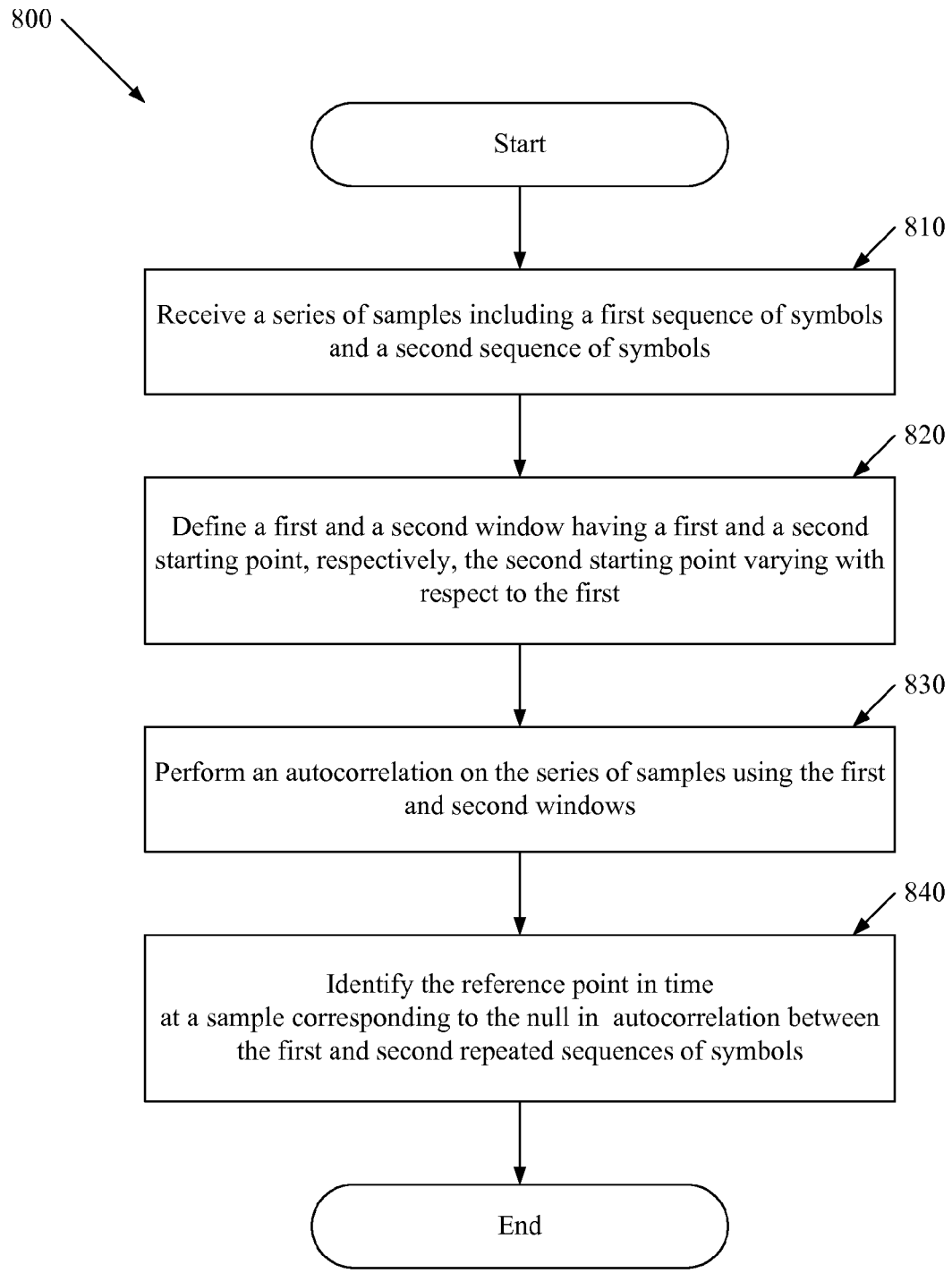
FIG. 8 illustrates an exemplary method according to certain embodiments.

The overall exemplary process, 800, is illustrated in the flow diagram of FIG. 8. A series of samples of a signal including a first sequence of repeated symbols and a second sequence of repeated symbols is received, at step 810. Then first and second windows having first and second starting points are defined, at step 820. The starting point of the second window is allowed to vary relative to the first starting point so as to include a different group of samples than that group of samples included in the first window. Next, in step 830, autocorrelation is performed between the two groups of samples. Finally, the reference point in time is identified, at step 840, at a sample corresponding to the null in autocorrelation that occurs between the first sequence of repeated symbols received and the second sequence of repeated symbols received.

Figure 8A:
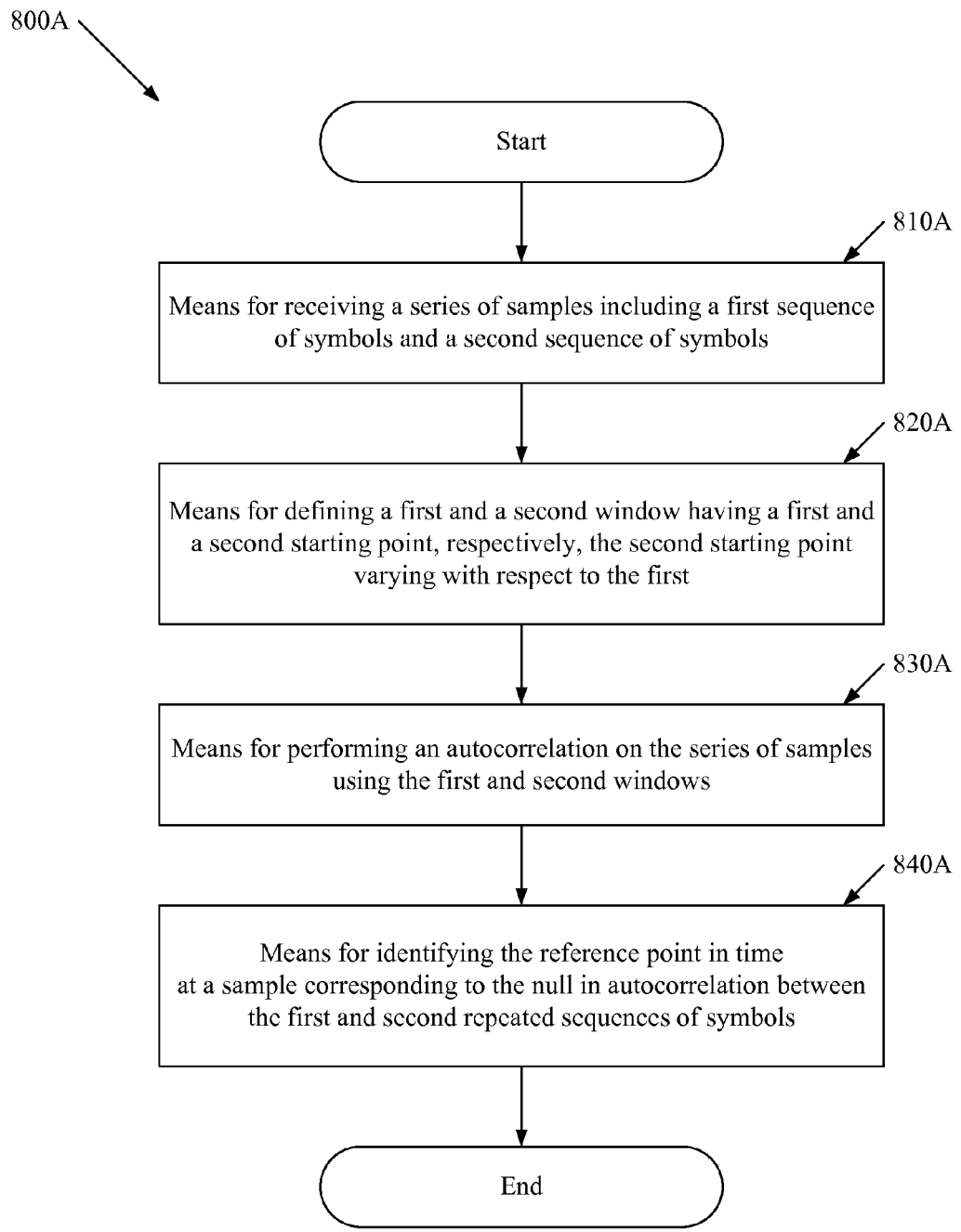
FIG. 8A illustrates means-plus-function blocks corresponding to the method shown in FIG. 8 according to certain embodiments.

The method 800 of FIG. 8 described above may be performed by various hardware and/or software component(s) and/or module(s) corresponding to the means-plus-function blocks 800A illustrated in FIG. 8A. In other words, blocks 810 through 840 illustrated in FIG. 8 correspond to means-plus-function blocks 810A through 840A illustrated in FIG. 8A.

Figure 9:
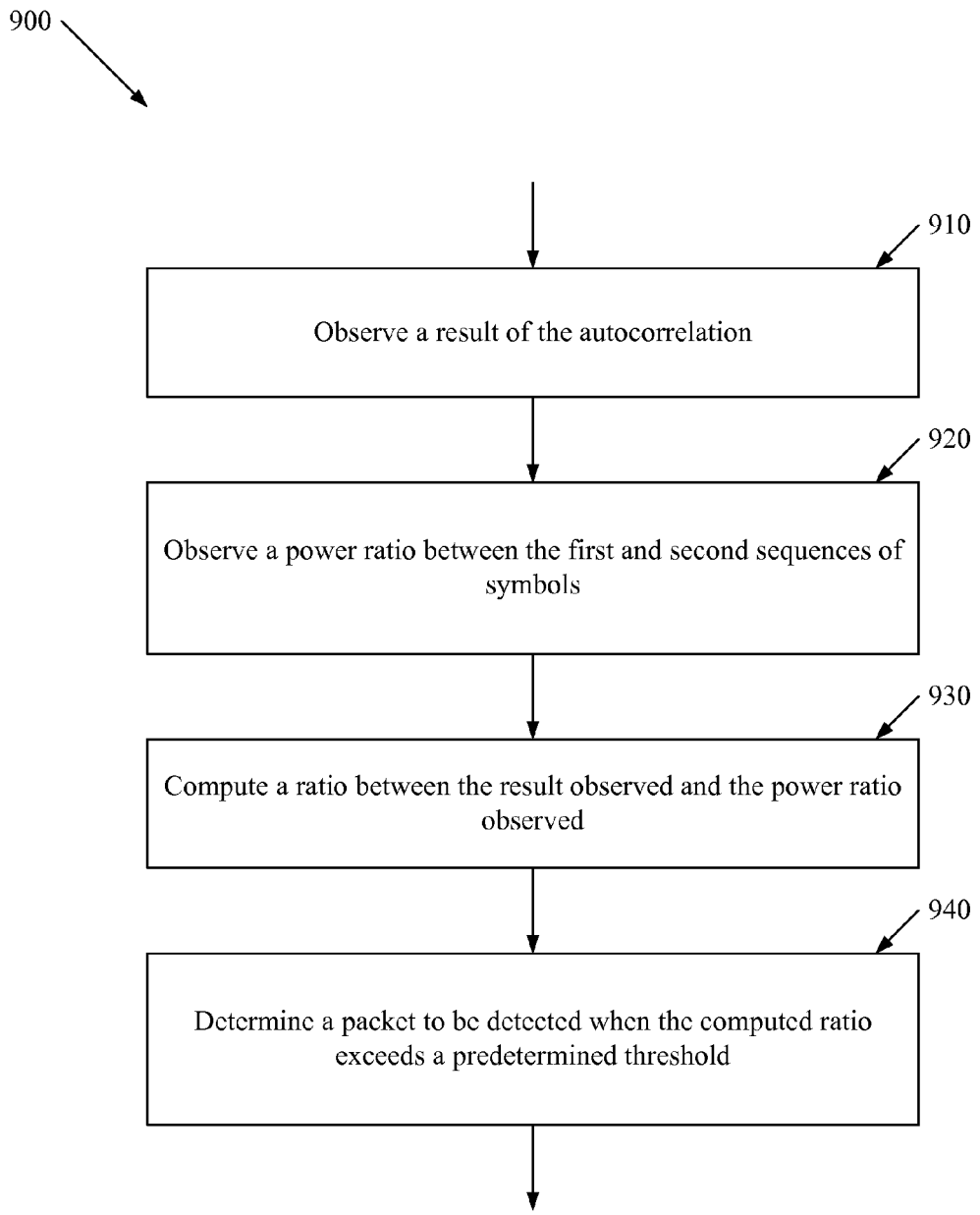
FIG. 9 illustrates an exemplary method according to certain embodiments.

Additional exemplary process detail, 900, is illustrated in FIG. 9. In step 910, the result of the autocorrelation (FIG. 8, step 830) is observed. In step 920, shown as following step 910, the result of a power ratio between signals representing the first and second sequences of symbols is observed. Steps 910 and 920 can be performed in either order. Next, in step 930, the ratio between the autocorrelation observation of step 910 and the power ratio of step 920 is computed. When the ratio of step 930 exceeds a threshold, a packet is deemed to be detected, in step 940.

Figure 9A:
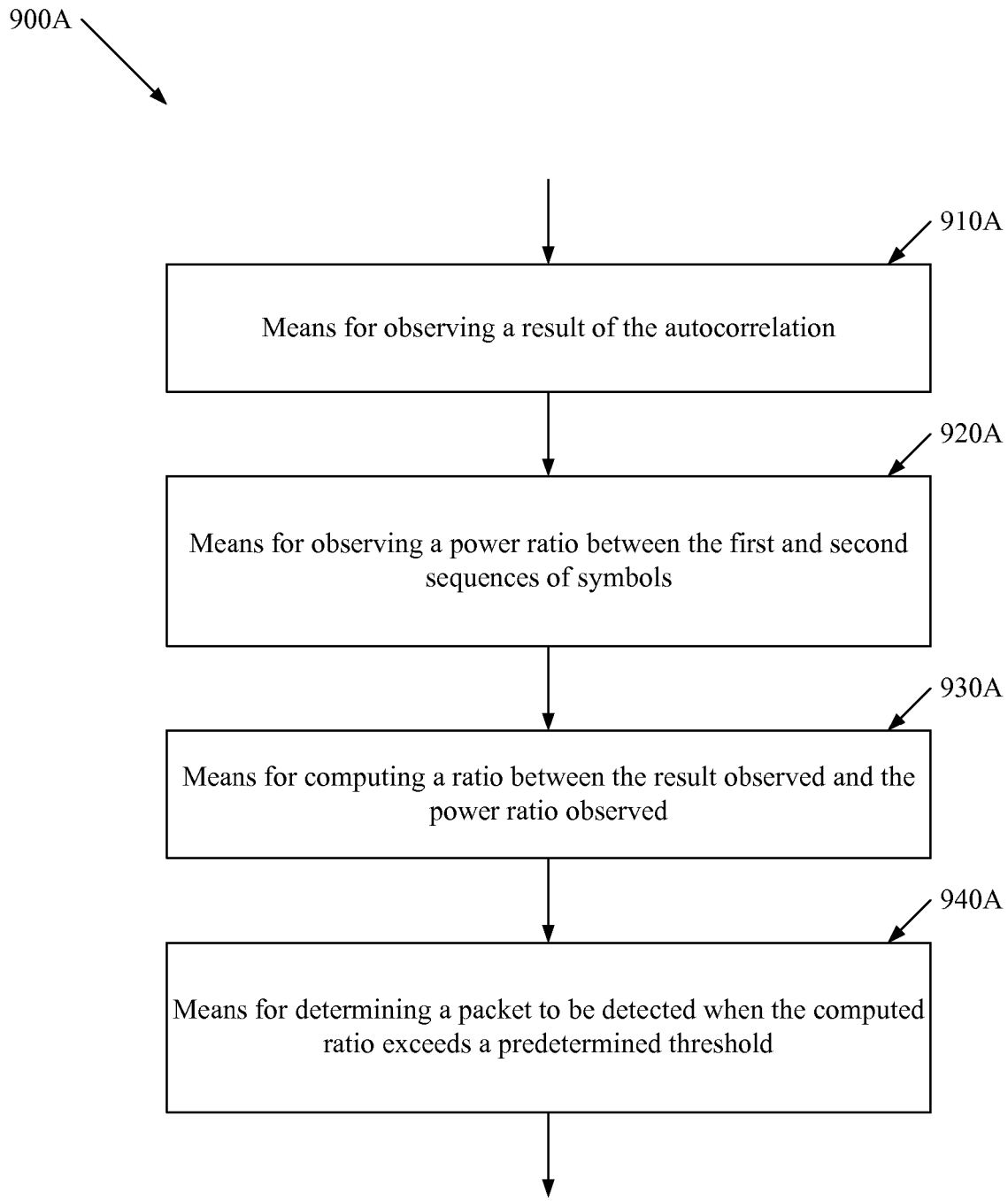
FIG. 9A illustrates means-plus-function blocks corresponding to the method shown in FIG. 9 according to certain embodiments.

The method 900 of FIG. 9 described above may be performed by various hardware and/or software component(s) and/or module(s) corresponding to the means-plus-function blocks 900A illustrated in FIG. 9A. In other words, blocks 910 through 940 illustrated in FIG. 9 correspond to means-plus-function blocks 910A through 940A illustrated in FIG. 9A.

Figure 10:
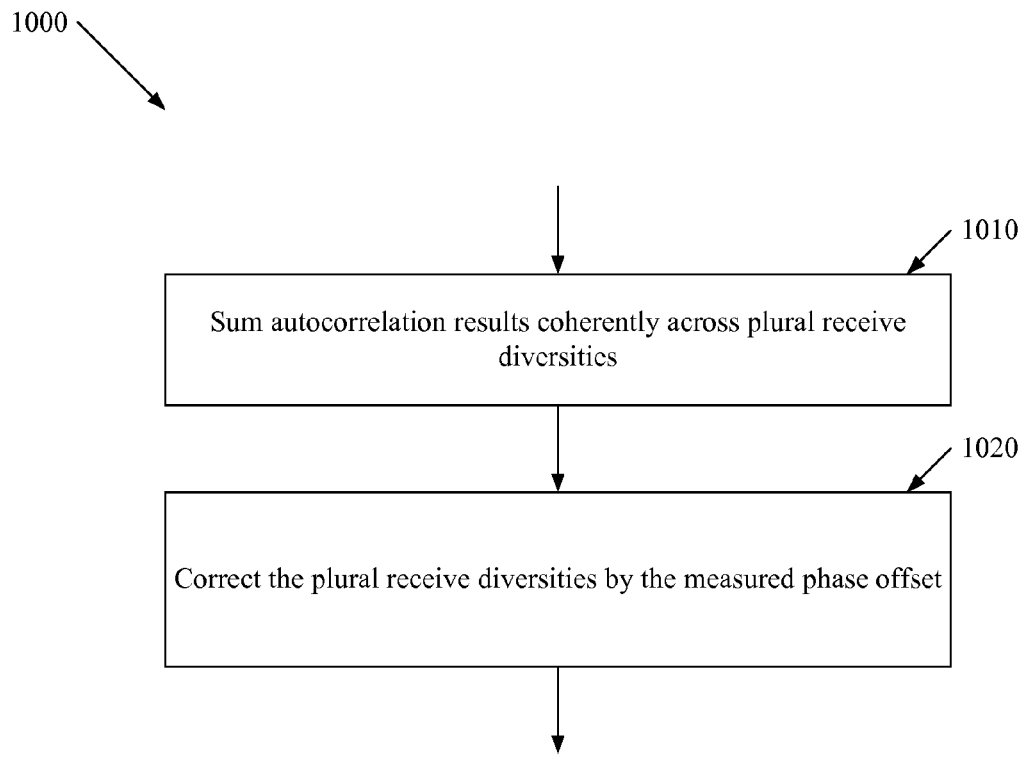
FIG. 10 illustrates an exemplary method according to certain embodiments.

Further exemplary process detail, 1000, is illustrated in FIG. 10. In step 1010, autocorrelation results are summed across plural receive diversities. For example, when a channel is diversified across plural transmit antennas, step 1010 is performed across the plural transmit antennas. Then, in step 1020, the plural receive diversities are corrected by the measured phase offset.

Figure 10A:
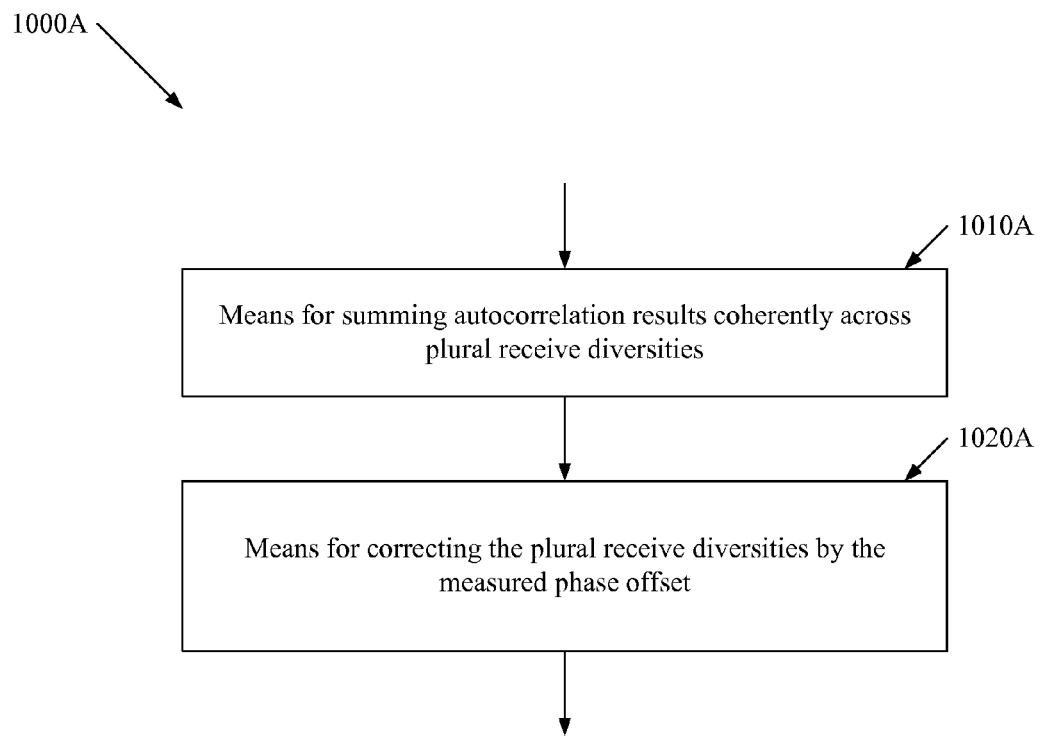
FIG. 10A illustrates means-plus-function blocks corresponding to the method shown in FIG. 10 according to certain embodiments.

The method 1000 of FIG. 8 described above may be performed by various hardware and/or software component(s) and/or module(s) corresponding to the means-plus-function blocks 1010A illustrated in FIG. 10A. In other words, blocks 1010 through 1020 illustrated in FIG. 10 correspond to means-plus-function blocks 1010A through 1020A illustrated in FIG. 10A.

Except in those instances where one method step is required by the nature of its input or its output to follow or to precede another method step, one skilled in the art will understand that method steps may be interchanged or performed in another order without departing from the scope of the application. For example, computation of the autocorrelation function and computation of the power function (both described above) may proceed in either order or in parallel, as both computation begin with the same input signal and do not depend on each other's result. Whether to perform such method steps in one order or another, or in parallel, can thus depend on optimizations of hardware components for cost, speed, size or other characteristics as may be desired.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the ideas disclosed herein. Various modifications to these embodiments will be readily apparent to those skilled in the art, and the generic principles defined herein may be applied to other embodiments without departing from the scope of the disclosure. Thus, the present application is not intended to be limited to the embodiments shown herein but is to be accorded the widest scope consistent with the principles and novel features disclosed herein.

What is claimed is:

1. A wireless communication apparatus, comprising:
   a receiver configured to receive a series of samples of a signal including a first repeated sequence of symbols and a second repeated sequence of symbols, define a first window having a first starting point and including a first group of samples of the series and a second window having a second starting point which varies relative to the first starting point and including a second group of samples of the series, perform an autocorrelation between the first and second groups of samples, and identify as a reference point in time a sample at which a null occurs in the autocorrelation.

2. The apparatus of claim 1, wherein the receiver is further configured to:
   observe a result of the autocorrelation;
   observe a power ratio between the first and second sequences of symbols;
   compute a ratio between the result observed and the power ratio observed; and
   determine a packet to be detected when the computed ratio exceeds a predetermined threshold.

3. The apparatus of claim 2, wherein the receiver is further configured to:
   sum autocorrelation results coherently across plural receive diversities; and correct the plural receive diversities by the measured phase offset.

4. A remote station, comprising:
   at least one processor configured to receive a series of samples of a signal including a first repeated sequence of symbols and a second repeated sequence of symbols, define a first window having a first starting point and including a first group of samples of the series and a second window having a second starting point which varies relative to the first starting point and including a second group of samples of the series, perform an autocorrelation between the first and second groups of samples, and identify as a reference point in time a sample at which a null occurs in the autocorrelation.

5. The remote station of claim 4, wherein the at least one processor is further configured to:
   observe a result of the autocorrelation;
   observe a power ratio between the first and second sequences of symbols;
   compute a ratio between the result observed and the power ratio observed; and
   determine a packet to be detected when the computed ratio exceeds a predetermined threshold.

6. The remote station of claim 5, wherein the at least one processor is further configured to:
   sum autocorrelation results coherently across plural receive diversities; and correct the plural receive diversities by the measured phase offset.

7. A base station, comprising:
   at least one processor configured to receive a series of samples of a signal including a first repeated sequence of symbols and a second repeated sequence of symbols, define a first window having a first starting point and including a first group of samples of the series and a second window having a second starting point which varies relative to the first starting point and including a second group of samples of the series, perform an autocorrelation between the first and second groups of samples, and identify as a reference point in time a sample at which a null occurs in the autocorrelation.

8. The base station of claim 7, wherein the at least one processor is further configured to:
   observe a result of the autocorrelation;
   observe a power ratio between the first and second sequences of symbols;
   compute a ratio between the result observed and the power ratio observed; and
   determine a packet to be detected when the computed ratio exceeds a predetermined threshold.

9. The base station of claim 8, wherein the at least one processor is further configured to: sum autocorrelation results coherently across plural receive diversities; and correct the plural receive diversities by the measured phase offset.

* * * * *